United States Patent
Gupta et al.

(10) Patent No.: US 9,769,280 B2
(45) Date of Patent: Sep. 19, 2017

(54) COOPERATIVE DECENTRALIZED CACHING

(71) Applicant: International Business Machines Corporation, Armonk, NY (US)

(72) Inventors: Sanchit Gupta, Patiala (IN); Shripad Nadgowda, New Delhi (IN); Akshat Verma, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 163 days.

(21) Appl. No.: 14/300,893

(22) Filed: Jun. 10, 2014

(65) Prior Publication Data

US 2015/0358421 A1 Dec. 10, 2015

(51) Int. Cl.
*G06F 15/16* (2006.01)
*H04L 29/08* (2006.01)
*G06F 3/06* (2006.01)
*G06F 17/30* (2006.01)
*H04L 12/24* (2006.01)

(52) U.S. Cl.
CPC .......... *H04L 67/2852* (2013.01); *G06F 3/06* (2013.01); *G06F 17/30132* (2013.01); *H04L 67/10* (2013.01); *H04L 67/288* (2013.01); *H04L 67/2842* (2013.01); *H04L 41/0893* (2013.01); *H04L 67/2847* (2013.01)

(58) Field of Classification Search
CPC ............ H04L 67/2852; H04L 67/2842; H04L 67/288; H04L 67/2847; H04L 67/10
See application file for complete search history.

(56) References Cited

U.S. PATENT DOCUMENTS

| | | | |
|---|---|---|---|
| 7,349,902 B1 * | 3/2008 | Arlitt | H04L 67/2842 709/217 |
| 8,108,620 B2 | 1/2012 | Anderson et al. | |
| 2003/0204602 A1 * | 10/2003 | Hudson | H04L 67/2842 709/224 |
| 2012/0079206 A1 * | 3/2012 | Zhao | H04L 67/2852 711/134 |
| 2013/0263194 A1 | 10/2013 | Zhang et al. | |
| 2015/0032710 A1 * | 1/2015 | Latrous | G06F 17/30371 707/703 |

* cited by examiner

*Primary Examiner* — Nam Tran
(74) *Attorney, Agent, or Firm* — Ference & Associates LLC

(57) ABSTRACT

Methods and arrangements for providing cooperative caching in a distributed system. A cache and a communicator are provided at a node in a distributed system. The communicator is used to communicate with at least one other node with respect to related data stored at the node and the at least one other node, via: communicating a status of the cache at the node and receiving notification of a status of at least one cache of at least one other node. There is updated, upon communicating with the at least one other node, at least one of: a cache replacement policy at the node and a cache pre-fetching policy at the node. Other variants and embodiments are broadly contemplated herein.

20 Claims, 10 Drawing Sheets

COOPERATIVE DECENTRALIZED CACHING

BACKGROUND

Historically, distributed storage involving multiple nodes has involved significant autonomy residing within each node. Local cache management ties in with patterns of local data access and will be relevant only to one node and not to others in a distributed system. Cooperative caching between nodes has been attempted in different manners, but a useful degree of efficiency in making use of distributed resources has still been elusive.

BRIEF SUMMARY

In summary, one aspect of the invention provides a method of providing cooperative caching in a distributed system, said method comprising: utilizing at least one processor to execute computer code configured to perform the steps of: providing a cache and a communicator at a node in a distributed system; using the communicator to communicate with at least one other node with respect to related data stored at the node and the at least one other node, via: communicating a status of the cache at the node and receiving notification of a status of at least one cache of the at least one other node; and updating, upon communicating with the at least one other node, at least one of: a cache replacement policy at the node and a cache pre-fetching policy at the node.

Another aspect of the invention provides an apparatus for providing cooperative caching in a distributed system, said apparatus comprising: at least one processor; and a computer readable storage medium having computer readable program code embodied therewith and executable by the at least one processor, the computer readable program code comprising: computer readable program code configured to use a communicator, at a node in a distributed system, to communicate with at least one other node with respect to related data stored at the node and the at least one other node, via: communicating a status of the cache at the node and receiving notification of a status of at least one cache of the at least one other node; and computer readable program code configured to update, upon communicating with the at least one other node, at least one of: a cache replacement policy at the node and a cache pre-fetching policy at the node.

A further aspect of the invention provides a computer program product for providing cooperative caching in a distributed system, said computer program product comprising: a computer readable storage medium having computer readable program code embodied therewith, the computer readable program code comprising: computer readable program code configured to use a communicator, at a node in a distributed system, to communicate with at least one other node with respect to related data stored at the node and the at least one other node, via: communicating a status of the cache at the node and receiving notification of a status of at least one cache of the at least one other node; and computer readable program code configured to update, upon communicating with the at least one other node, at least one of: a cache replacement policy at the node and a cache pre-fetching policy at the node.

An additional aspect of the invention provides a method comprising: with respect to a node in a distributed system, communicating asynchronously with at least one other node with respect to mutually segmented and/or co-related data stored at the node and the at least one other node, via: communicating metadata relating to a status of a cache at the node and receiving metadata relating to notification of a status of at least one cache of the at least one other node; and updating, upon communicating with the at least one other node, at least one of: a cache replacement policy which is determined by cache events at the node and at the at least one other node; and a cache pre-fetching policy which is determined by data access patterns at the node and at the at least one other node.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-8. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 10. In accordance with an exemplary embodiment, most if not all of the process steps, components and outputs discussed with respect to FIG. 1-8 can be performed or utilized by way of a processing unit or units and system memory such as those indicated, respectively, at 16' and 28' in FIG. 10, whether on a server computer, a client computer, a node computer in a distributed network, or any combination thereof.

Figure 1:
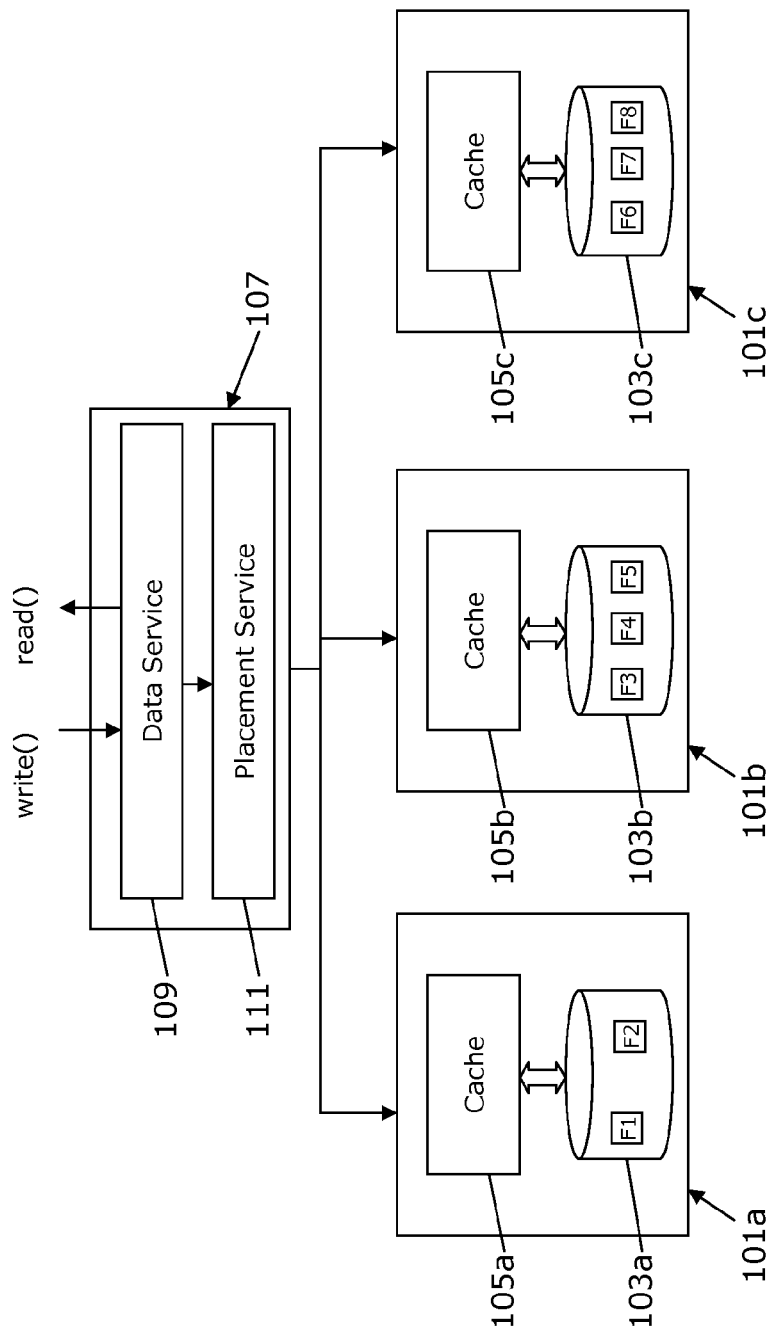
FIG. 1 schematically illustrates a conventional distributed storage arrangement with multiple nodes.
Figure 6:
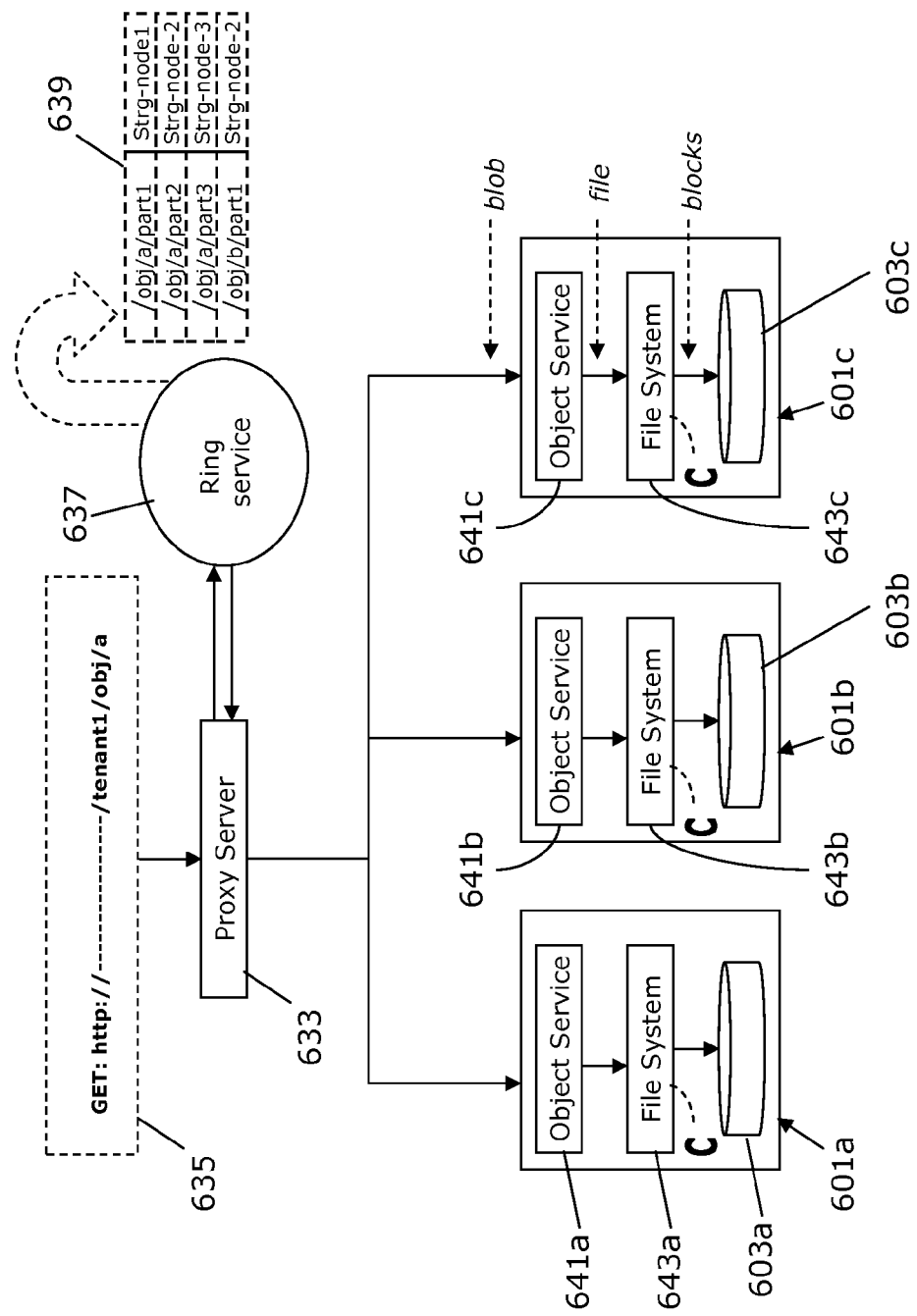
FIG. 6 schematically illustrates a working example of an overall distributed system architecture including multiple nodes.
Figure 7:
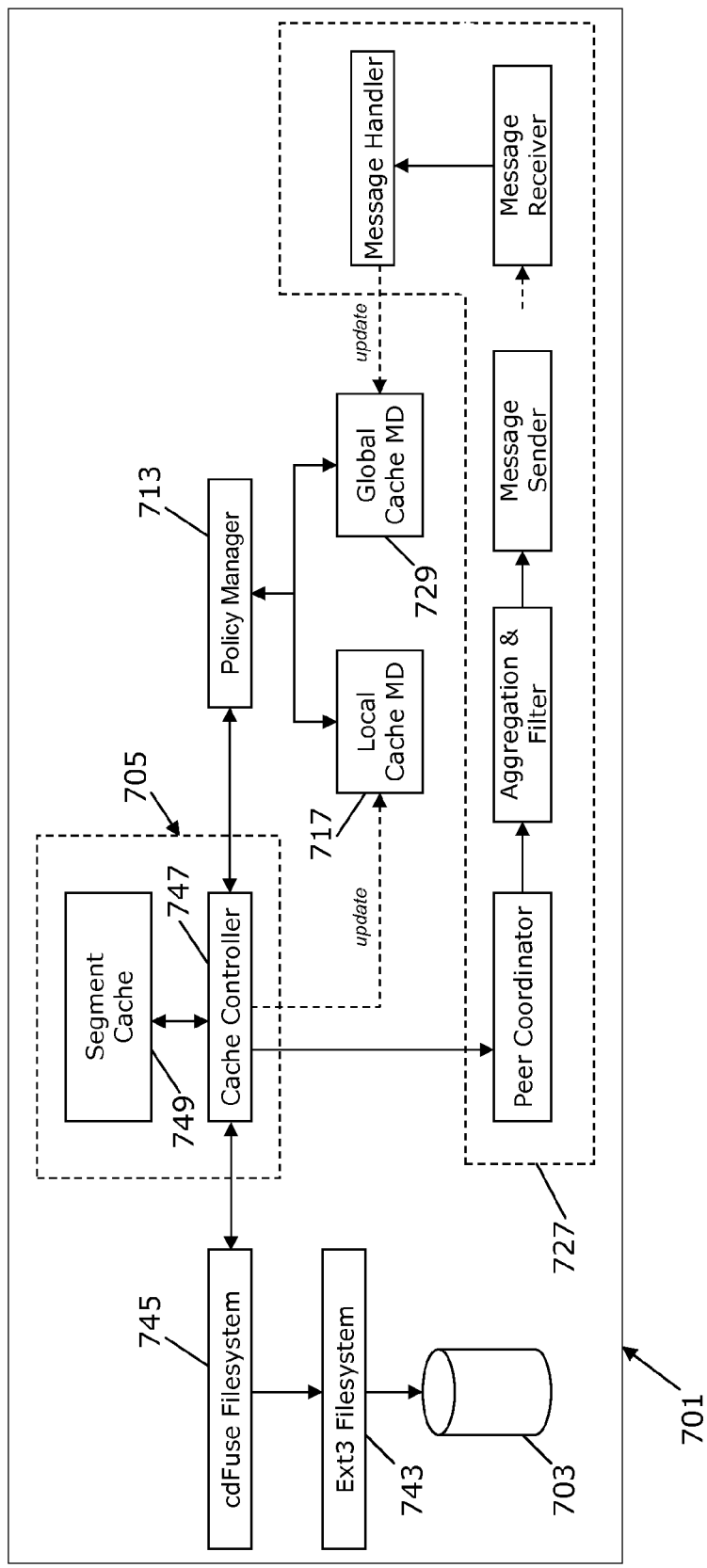
FIG. 7 schematically illustrates a working example of an implementation of a cooperative distributed caching policy.
Figure 8:
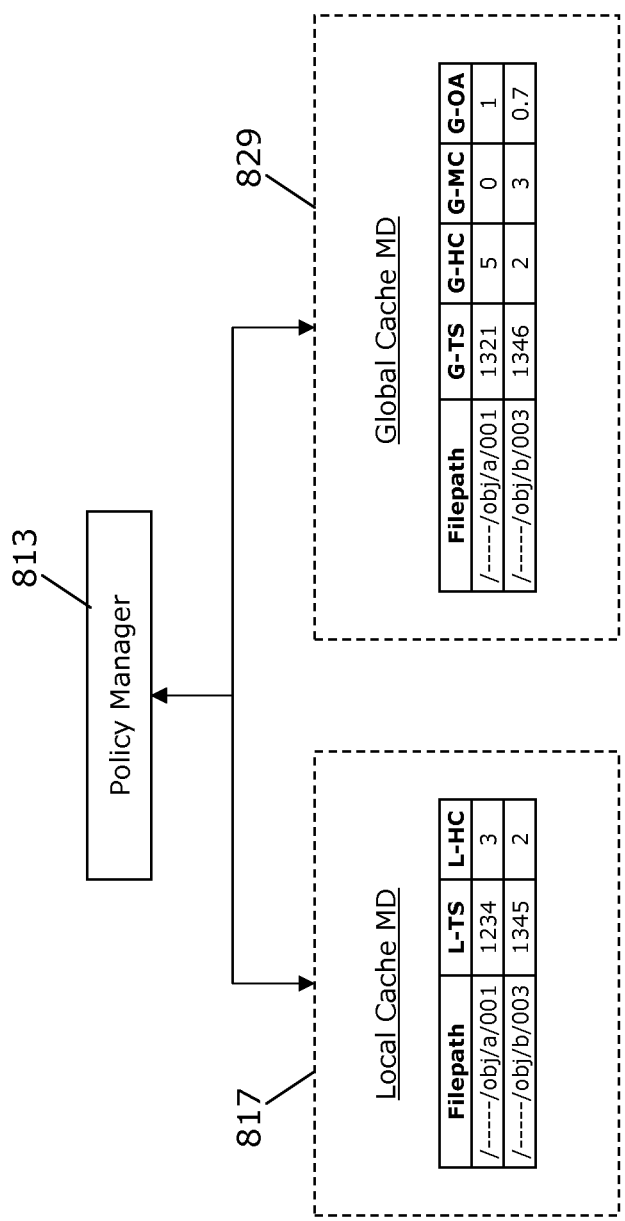
FIG. 8 schematically illustrates a working example of node-level cache management.

To facilitate easier reference, in advancing from FIG. 1 to and through FIG. 8, a reference numeral is advanced by a multiple of 100 in indicating a substantially similar or analogous component or element with respect to at least one component or element found in at least one earlier figure among FIGS. 1-8.

As mentioned heretofore, distributed storage involving multiple nodes has involved significant autonomy residing within each node. An example of such an arrangement is schematically illustrated in FIG. 1, showing three storage nodes 101a/b/c. Here, it can be seen that each storage node is responsible only for managing local storage (103a/b/c, respectively) and a local cache (105a/b/c, respectively). A centralized data placement service 107, as shown, determines one or more locations among nodes 101a/b/c to which data are to be written (e.g., different types of data may be directed to nodes that are specifically configured for handling such data), but there may be no further refinement to the process than this. (Data placement service 107 includes data service 109, which accepts incoming writes and directs outgoing reads, while an associated placement service 111 acts to determine the destination of one or more writes.) Thus, as shown, data belonging to a single application or entity will be stored on one and only one node such that, as shown here, data associated with individual applications F1 . . . F8, will not be split between multiple nodes.

Figure 2:
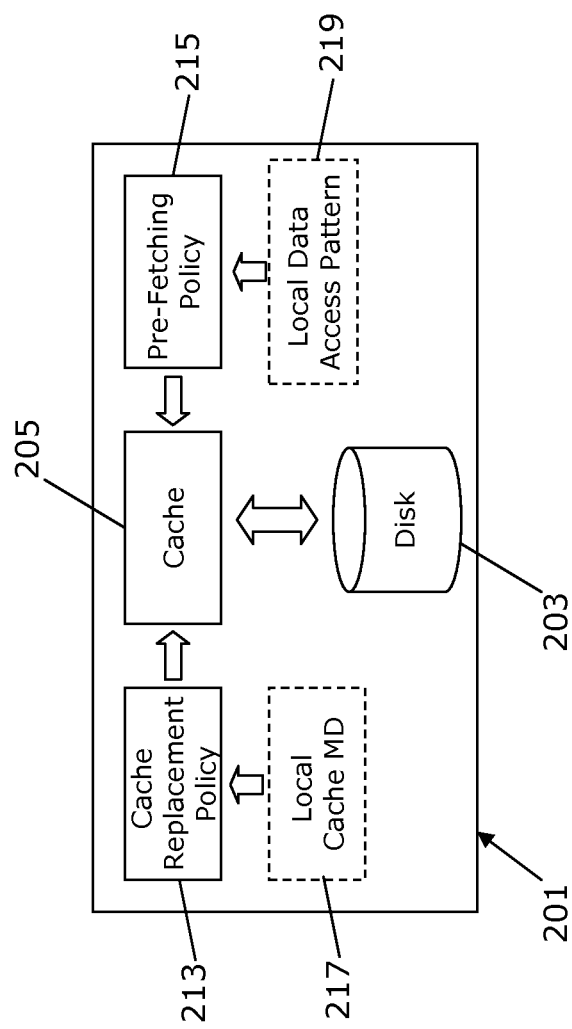
FIG. 2 schematically illustrates a conventional process for local caching at a single node.

FIG. 2 schematically illustrates a conventional process for local caching at a single node 201. Cache 205 operates in accordance with a cache replacement policy 213 and a pre-fetching policy 215. Here, the cache replacement policy 213 is based solely on locally accessed cache metadata (MD) 217 (i.e., unaffected by any activity taking place at others nodes in a distributed system), while the cache pre-fetching policy 215 is based solely on local data access patterns 219. "Cache replacement", as understood herein, generally refers to an algorithm-defined policy for discarding items from cache 205 when the same becomes full, while a "cache pre-fetching policy", as understood herein, generally refers to an algorithm-defined policy for preliminarily bringing data from the disk 203 into cache 205, before it might be specifically called up or needed.

Figure 3:
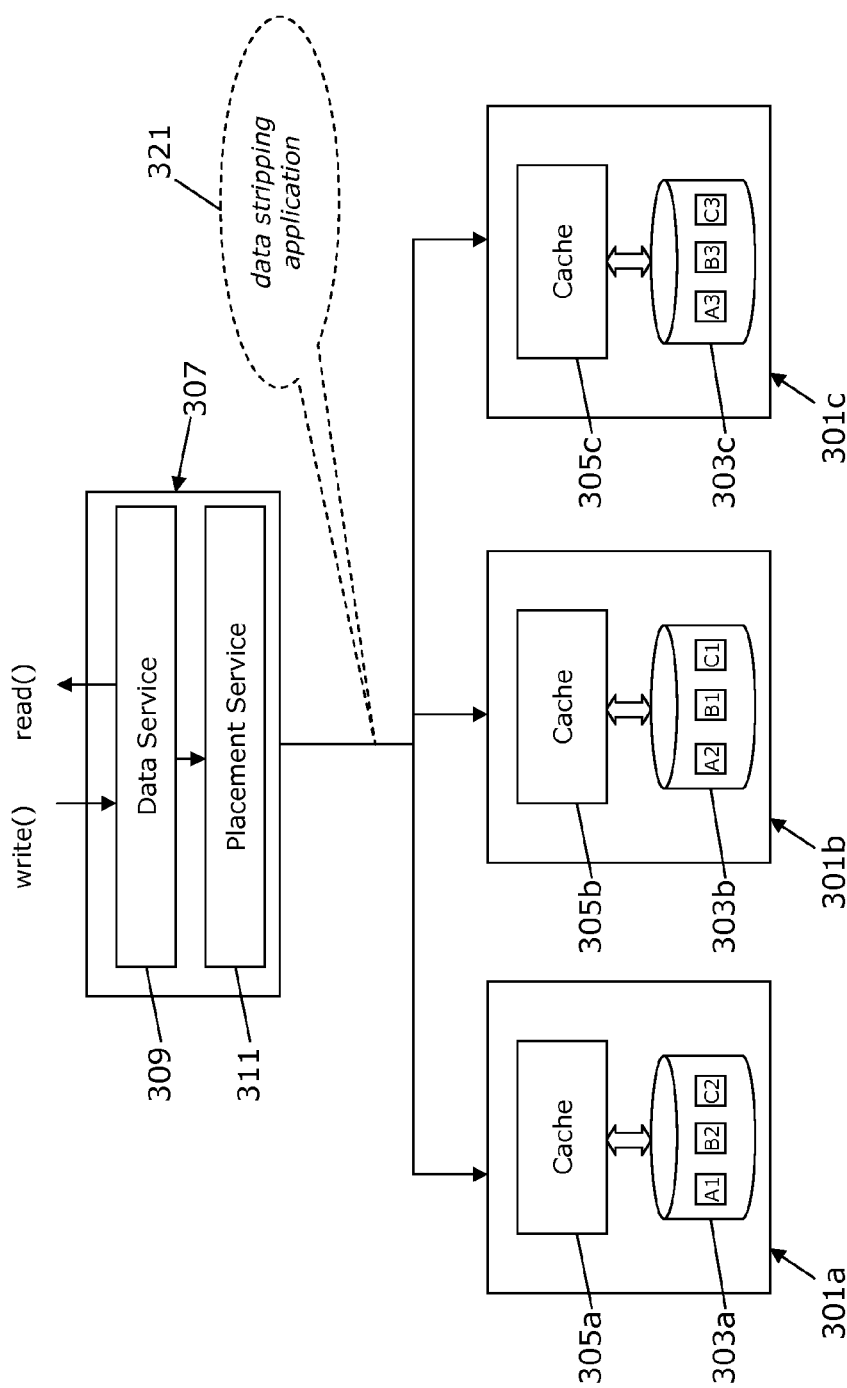
FIG. 3 schematically illustrates a conventional arrangement for data co-relations in a distributed storage application.

FIG. 3, for its part, schematically illustrates a conventional arrangement for storing related data in a distributed storage application. Related data, as broadly understood herein, can involve an original data store split (or stripped) into segments, or co-related data originating from a common application. In the first instance, data, to be written to storage, can be stripped into segments (e.g., via a data stripping application 321) and then stored at different storage nodes (among nodes 301a/b/c), with the effect of aiming for parallel disk throughput. A policy of erasure coding then leads to storing data segments and code segments on different nodes to achieve redundancy (mainly, to provide data backup). In the other instance, co-related data stored on different nodes can be maintained on an application-specific basis. Thus, by way of an example, if a web server uses distributed storage, a web page may include embedded HTML and image files which might end up being stored separately on different storage nodes. The effect of stripping, or storing co-related data, can be appreciated in FIG. 3 with different segments (or other portions) of original data "A", "B" and "C", designated here with different numerals, being stored in different local storage locations 303a/b/c.

Figure 4:
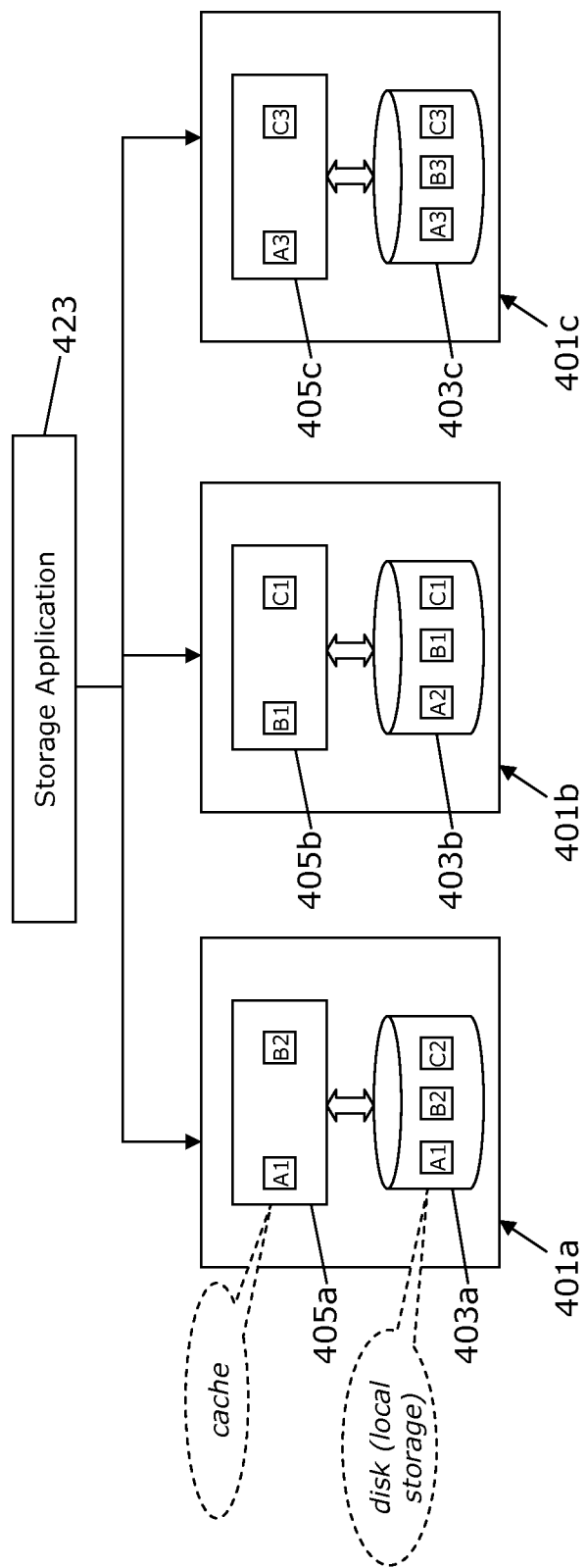
FIG. 4 schematically illustrates a conventional arrangement for partial data caching.

FIG. 4 schematically illustrates a conventional arrangement for partial data caching, involving a preconfigured storage application 423 which directs reads/writes to/from nodes 401a/b/c. Since caching is still focused locally, some segments (or portions) of data are missed during caching one or more of the storage nodes 401a/b/c, as can be appreciated from missing segments/portions within cache in FIG. 4. For instance, as shown here, a segment C2, a segment A2 and a segment B3 may be missing from each of caches 405a/b/c of nodes 401a/b/c, respectively. Data access here is limited by disk latency, even in the case of a single segment cache miss.

In accordance with at least one embodiment of the invention, there are broadly contemplated herein methods and arrangements for cooperative caching in distributed nodes, with an objective of ensuring parallel disk access across different nodes such that the time to retrieve a complete object (or set of data) is the same regardless of whether there is a cache miss on a single node or on more than one node (e.g., all nodes in the distributed system).

Figure 5:
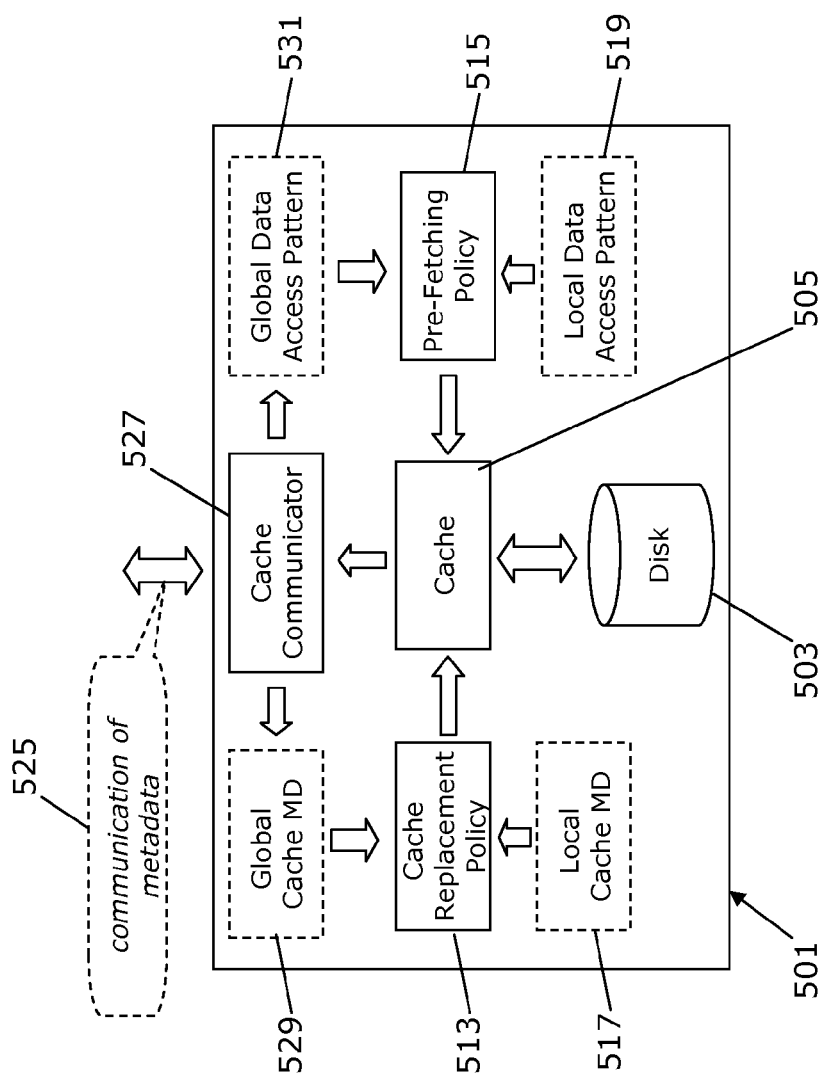
FIG. 5 schematically illustrates a cooperative distributed cache arrangement at a single node.

FIG. 5 schematically illustrates a cooperative distributed cache arrangement at a single node 501, in accordance with at least one embodiment of the invention. Here, as shown, local cache operations are communicated (525) to peer storage nodes asynchronously; in at least one embodiment, the node 501 and at least one peer storage node store related data. Such communication involves metadata, and not data per se. A locally-based cache communicator 527 thus is able to listen to and receive one or more peer nodes' cache notifications. Accordingly, global cache MD 529 and local cache MD 517 can be maintained at the node to jointly determine (or guide) a cache replacement policy 513 (updated in response to the peer nodes' cache notifications), while a global data access pattern 531 and local data access pattern 519 can be determined, and used at the node to jointly yield a pre-fetching policy 515 (also updated in response to the peer nodes' cache notifications). Thus, the node 501 internally includes mechanisms for maintaining information on peer node caches, which can be obtained merely via an exchange of metadata (525) with other nodes, thus saving on distributed system resources.

With relation to FIGS. 6-8, the disclosure now turns to a discussion of working examples drawing on general principles as discussed herein, in accordance with at least one embodiment of the invention. The working examples to follow are provided for illustrative purposes only, and are merely indicative of possibilities for a very wide range of implementations within a general, encompassing scope of embodiments of the invention.

FIG. 6 schematically illustrates a working example of an overall distributed system architecture including multiple nodes 601a/b/c, in accordance with at least one embodiment of the invention. Here, a proxy server 633 in communication with all nodes exposes a public API (application programming interface) 635 for object access, but does not actually serve to cache objects. If the size of an object exceeds a predetermined threshold, e.g., 5 GB, then the object is fragmented. Thus, embodied here is an interface for applications to fragment data and store fragments or smaller sized objects.

In accordance with at least one embodiment of the invention, a ring service 637 determines a location (storage node) for each object based on consistent hashing (itself, e.g., based on a hash table 639). On each storage node 601a/b/c, a respective object service 641a/b/c receives blob I/O (input/output) requests, and reads/writes file from/to a lower file system 643a/b/c (e.g., an ext3 file system), itself in communication with a disk 603a/b/c (to/from which data blocks are written/read). In a manner to be appreciated more fully below, caching activity among components related to caching (represented by block letter "C" in each of nodes 601a/b/c) may take place in a decentralized manner, involving metadata communication with peer nodes, in accordance with general considerations as set forth herein with respect of FIG. 5.

In accordance with at least one embodiment of the invention, FIG. 7 schematically illustrates a working example of an implementation of a cooperative distributed caching policy with respect to a single node 701, and in a working context such as that set forth in FIG. 6. As shown, node 701 may include a CD FUSE (file system in user space) file system 745 in communication with an ext3 file system 742 and disk storage 703. A cache 705 includes two components, namely, a cache controller 747 and a segment cache 749. The cache controller 747 is in communication with a cache communicator 727 which includes several components: a peer coordinator, aggregator/filter, message sender, message receiver and message handler. The cache controller 747 is also in communication with CD FUSE file system 745 and a caching policy manager 713. Policy manager 713 is guided by local cache metadata 717 and global cache metadata 729.

In accordance with at least one embodiment of the invention, cache communicator 727 serves to transmit local caching metadata to peer nodes in a distributed network; this may be done, e.g., via an external application with which peer nodes can communicate. Node 701 also receives peer node caching metadata in order to update the locally stored global caching metadata 729. In an embodiment, message sending and receipt can be undertaken via message broker software such as RabbitMQ. Received messages are passed to the message handler of communicator 727, to update global MD 729. Cache controller 747 also serves to update the local cache MD 717, based on a current state of segment cache 749.

In accordance with at least one embodiment of the invention, FIG. 8 schematically illustrates a working example of node-level cache management. As shown, a policy manager 813 can be guided by local and global cache metadata (817 and 829, respectively). The locally stored local and global cache MD 817/829 can assume essentially any suitable format, with an illustrative and non-restrictive example being shown here. As such, global cache MD 829 can be configured to include four columns of data with respect to each reported object: a global timestamp (G-TS), global hit count (G-HC), global miss count (G-MC) and global object availability (G-OA). Thus, with respect to a given object: G-TS represents a latest timestamp received from any peer node; G-HC represents a hit count for the noted object over a given data segment; G-MC represents the number of storage nodes on which a peer segment was missed (wherein a segment may not necessarily be in local cache); and G-OA represents a fraction of peer nodes on which a peer segments is available in cache. As shown, local cache MD 817 can include two columns of data with respect to each object: L-TS (local timestamp) and L-HC (local hit count). The L-TS parameter represents a latest timestamp with respect to a local cache event for the object in question, while L-HC represents a local hit count for the object.

Figure 9:
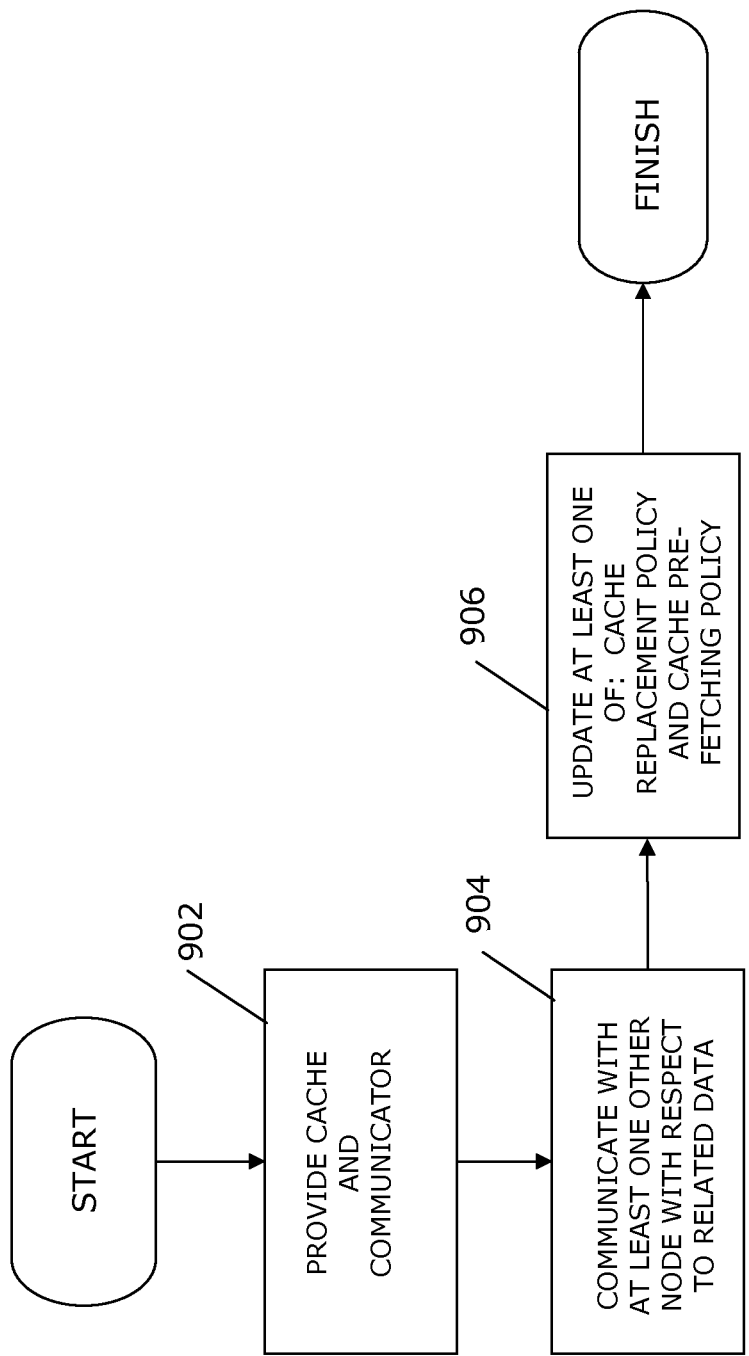
FIG. 9 sets forth a process more generally for providing cooperative distributed caching.

FIG. 9 sets forth a process more generally for providing cooperative caching in a distributed system, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 10. In accordance with an example embodiment, most if not all of the process steps discussed with respect to FIG. 9 can be performed by way of a processing unit or units and system memory such as those indicated, respectively, at 16' and 28' in FIG. 10.

As shown in FIG. 9, in accordance with at least one embodiment of the invention, a cache and a communicator are provided at a node in a distributed system (902). The communicator is used to communicate with at least one other node with respect to related data stored at the node and the at least one other node, via: communicating a status of the cache at the node and receiving notification of a status of at least one cache of at least one other node (904). There is updated, upon communicating with the at least one other node, at least one of: a cache replacement policy at the node and a cache pre-fetching policy at the node (906).

Figure 10:
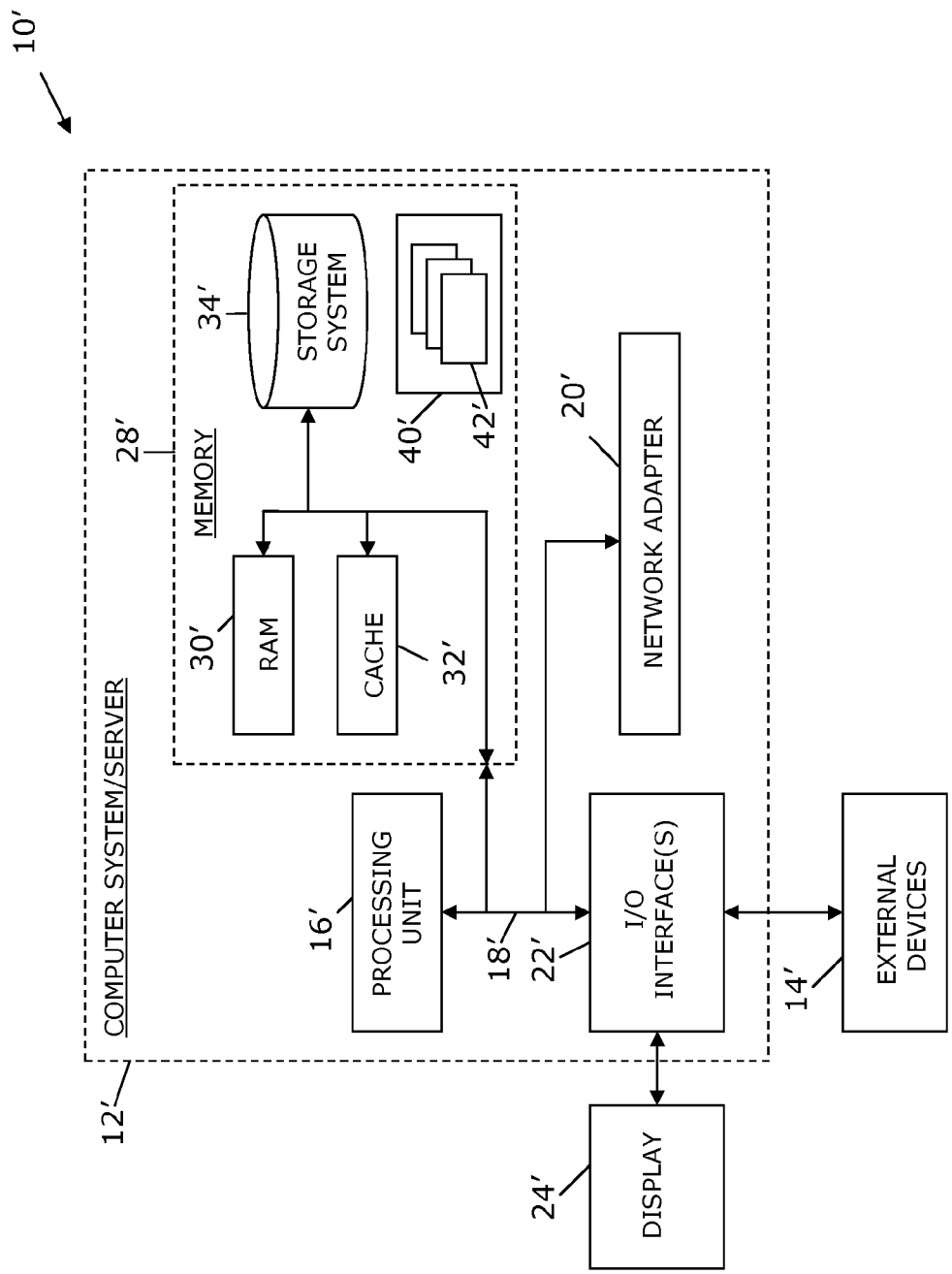
FIG. 10 illustrates a computer system.

Referring now to FIG. 10, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of providing cooperative caching in a distributed system, said method comprising:
   utilizing at least one processor to execute computer code configured to perform the steps of:
   providing a global cache, a plurality of local caches, and a plurality of communicators in a distributed system, wherein each of the plurality of local caches and each of the plurality of communicators are associated with a peer in the distributed system;
   using the communicator to communicate with at least one other peer with respect to a data object, wherein the data object is fragmented and wherein at least one fragment of the data object is stored at the peer and wherein at least another fragment of the data object is stored at the at least one other peer, via: communicating only metadata related to a status of the at least one fragment in the local cache associated with the peer and receiving notification of a status of the at least another fragment in the local cache associated with the at least one other peer;
   updating, based upon communicating, local caching metadata of the local caches associated with the peer and the at least one other peer, wherein the updating comprises updating a local timestamp and a local hit count associated with the local cache;
   updating, based upon the updated local caching metadata, global caching metadata of the global cache, wherein the global cache identifies the peer comprising the at least one fragment of the data objects and the at least one other peer comprising the at least another fragment of the object and wherein the updating comprises updating a global timestamp, a global hit count, a global miss count, and a global object availability associated with the global cache; and
   updating, based upon the global caching metadata and the local caching metadata, at least one of: a cache replacement policy at the peer and a cache pre-fetching policy at the peer.

2. The method according to claim 1, wherein said communicating with at least one other peer comprises communicating via an external application.

3. The method according to claim 1, wherein the cache replacement policy is determined by cache events at the peer and at the at least one other peer.

4. The method according to claim 3, wherein the cache replacement policy is determined by:
local metadata stored at the peer, corresponding to cache events at the peer; and
global metadata stored at the peer, corresponding to cache events at the at least one other peer.

5. The method according to claim 4, wherein the global metadata comprise at least one of: a global timestamp, a global hit count, a global miss count and global object availability.

6. The method according to claim 4, wherein the local metadata comprise at least one of: a local timestamp and a local hit count.

7. The method according to claim 1, wherein the cache pre-fetching policy is determined by data access patterns at the peer and at the at least one other peer.

8. The method according to claim 1, wherein said communicating with at least one other peer comprises communicating asynchronously.

9. The method according to claim 1, wherein the related data comprise different segments of an original data store that are stored at the peer and the at least one other peer.

10. The method according to claim 1, wherein the related data comprise co-related data partitioned between the peer and the at least one other peer.

11. An apparatus for providing cooperative caching in a distributed system, said apparatus comprising:
at least one processor; and
a computer readable storage medium having computer readable program code embodied therewith and executable by the at least one processor, the computer readable program code comprising:
the distributed system comprising a global cache, a plurality of local caches, and a plurality of communicators, wherein each of the plurality of local caches and each of the plurality of communicators are associated with a peer in the distributed system;
computer readable program code configured to use a communicator, at a peer in a distributed system, to communicate with at least one other peer with respect to a data object, wherein the data object is fragmented and wherein at least one fragment of the data object is stored at the peer and wherein at least another fragment of the data object is stored at the at least one other peer, via: communicating only metadata related to a status of the at least one fragment in the local cache associated with the peer and receiving notification of a status of the at least another fragment in the local cache associated with the at least one other peer;
computer readable program code configured to update, based upon communicating, local caching metadata of the local caches associated with the peer and the at least one other peer, wherein the updating comprises updating a local timestamp and a local hit count associated with the local cache;
computer readable program code configured to update, based upon the updated local caching metadata, global caching metadata of the global cache, wherein the global cache identifies the peer comprising the at least one fragment of the data objects and the at least one other peer comprising the at least another fragment of the object and wherein the updating comprises updating a global timestamp, a global hit count, a global miss count, and a global object availability associated with the global cache; and
computer readable program code configured to update, based upon the global caching metadata and the local caching metadata, at least one of: a cache replacement policy at the peer and a cache pre-fetching policy at the peer.

12. A computer program product for providing cooperative caching in a distributed system, said computer program product comprising:
a computer readable storage medium having computer readable program code embodied therewith, the computer readable program code comprising:
the distributed system comprising a global cache, a plurality of local caches, and a plurality of communicators, wherein each of the plurality of local caches and each of the plurality of communicators are associated with a peer in the distributed system;
computer readable program code configured to use a communicator, at a peer in a distributed system, to communicate with at least one other peer with respect to a data object, wherein the data object is fragmented and wherein at least one fragment of the data object is stored at the peer and wherein at least another fragment of the data object is stored at the at least one other peer, via: communicating only metadata related to a status of the at least one fragment in the local cache associated with the peer and receiving notification of a status of the at least another fragment in the local cache associated with the at least one other peer;
computer readable program code configured to update, based upon communicating, local caching metadata of the local caches associated with the peer and the at least one other peer, wherein the updating comprises updating a local timestamp and a local hit count associated with the local cache;
computer readable program code configured to update, based upon the updated local caching metadata, global caching metadata of the global cache, wherein the global cache identifies the peer comprising the at least one fragment of the data objects and the at least one other peer comprising the at least another fragment of the object and wherein the updating comprises updating a global timestamp, a global hit count, a global miss count, and a global object availability associated with the global cache; and
computer readable program code configured to update, based upon the global caching metadata and the local caching metadata, at least one of: a cache replacement policy at the peer and a cache pre-fetching policy at the peer.

13. The computer program product according to claim 12, wherein to communicate with at least one other peer comprises communicating via an external application.

14. The computer program product according to claim 12, wherein the cache replacement policy is determined by cache events at the peer and at the at least one other peer.

15. The computer program product according to claim 14, wherein the cache replacement policy is determined by:
local metadata stored at the peer, corresponding to cache events at the peer; and
global metadata stored at the peer, corresponding to cache events at the at least one other peer.

16. The computer program product according to claim 12, wherein the cache pre-fetching policy is determined by data access patterns at the peer and at the at least one other peer.

17. The computer program product according to claim 12, wherein to communicate with at least one other peer comprises communicating asynchronously.

18. The computer program product according to claim 12, wherein the related data comprise different segments of an original data store that are stored at the peer and the at least one other peer.

19. The computer program product according to claim 12, wherein the related data comprise co-related data partitioned between the peer and the at least one other peer.

20. A method comprising:
- providing a global cache, a plurality of local caches, and a plurality of communicators in a distributed system, wherein each of the plurality of local caches and each of the plurality of communicators are associated with a peer in the distributed system;
- with respect to a peer in a distributed system, communicating asynchronously with at least one other peer with respect to mutually segmented and/or co-related data wherein at least one piece of the data is stored at the peer and wherein at least another piece of the data is stored at the at least one other peer, via: communicating metadata relating to a status of the at least one piece of the data in the local cache at the peer and receiving metadata relating to notification of a status of the at least another piece of the data in at least one local cache of the at least one other peer;
- updating, based upon communicating, local caching metadata of the local caches associated with the peer and the at least one other peer, wherein the updating comprises updating a local timestamp and a local hit count associated with the local cache;
- updating, based upon the updated local caching metadata, global caching metadata of the global cache, wherein the global cache identifies the peer comprising the at least one fragment of the data objects and the at least one other peer comprising the at least another fragment of the object and wherein the updating comprises updating a global timestamp, a global hit count, a global miss count, and a global object availability associated with the global cache; and
- updating, based upon the global caching metadata and the local caching metadata, at least one of:
- a cache replacement policy which is determined by cache events at the peer and at the at least one other peer; and
- a cache pre-fetching policy which is determined by data access patterns at the peer and at the at least one other peer.

* * * * *